United States Patent [19]

Schneider

[11] Patent Number: 5,555,772
[45] Date of Patent: Sep. 17, 1996

[54] POSITION CONTROL APPARATUS FOR STEERING COLUMN

[75] Inventor: Douglas M. Schneider, Bridgeport, Mich.

[73] Assignee: General Motors Corporation, Detroit, Mich.

[21] Appl. No.: 332,302

[22] Filed: Oct. 31, 1994

[51] Int. Cl.6 ........................................... B62D 1/18
[52] U.S. Cl. ................................ 74/493; 280/775
[58] Field of Search .................. 74/493–492; 280/775, 280/777

[56] References Cited

U.S. PATENT DOCUMENTS

| | | | |
|---|---|---|---|
| 4,240,305 | 12/1980 | Denaldi et al. | 74/493 |
| 4,472,982 | 9/1984 | Nishikawa | 74/493 |
| 4,732,050 | 3/1988 | Vollmer | 74/493 |
| 5,052,240 | 10/1991 | Miyoshi et al. | 74/493 |
| 5,161,425 | 11/1992 | Baskett et al. | 74/493 |

FOREIGN PATENT DOCUMENTS 405262238  10/1993  Japan ..................... 74/493

Primary Examiner—Charles A. Marmor
Assistant Examiner—Mary Ann Battista
Attorney, Agent, or Firm—Saul Schwartz

[57] ABSTRACT

A position control apparatus for an adjustable motor vehicle steering column including a clamp having a first jaw element and a second jaw element shiftable axially relative to each other, a control lever pivotable through an angular stroke between a clamping position and a releasing position, and means for converting pivotal movement of the control lever to a first axial stroke of the first jaw element and to an opposite second axial stroke of the second jaw element so that the total relative axial stroke between the first and the second jaw elements is the sum of the first and the second axial strokes.

8 Claims, 3 Drawing Sheets

POSITION CONTROL APPARATUS FOR STEERING COLUMN

FIELD OF THE INVENTION

This invention relates to position control apparatus for adjustable motor vehicle steering columns.

BACKGROUND OF THE INVENTION

A common position control apparatus for adjustable motor vehicle steering columns includes a bracket on the vehicle body having parallel legs straddling the steering column and a clamp which squeezes the legs of the bracket against the steering column when a control lever is pivoted to a clamping position. Usually, screw threads or a rotary cam in the control apparatus converts rotation of the control lever to axial separation between jaw elements of the clamp. In clamps having interlocking features such as spline teeth on the jaw elements, smooth adjustment of the position of the steering column requires maximum separation between the interlocking features in a releasing position of the control lever. To that end, some prior apparatuses maximize axial separation between jaw elements of the clamp by means of multiple lead screw threads or by means of rotary cams with steep ramps. A position control apparatus according to this invention is an improvement relative to prior position control apparatuses having either screw threads or rotary cams.

SUMMARY OF THE INVENTION

This invention is a new and improved position control apparatus for an adjustable motor vehicle steering column including a clamp having a first jaw element and a second jaw element shiftable axially relative to each other, a control lever pivotable through an angular stroke between a clamping position and a releasing position, and means for converting pivotal movement of the control lever between the clamping and releasing positions to a first axial stroke of the first jaw element and to an opposite second axial stroke of the second jaw element so that the total relative axial stroke between the first and the second jaw elements corresponding to a complete angular stroke of the operating lever is the sum of the first and the second axial strokes. In a preferred embodiment, a rotary cam between the first jaw element and a control shaft connected to the control lever converts pivotal movement of the control lever to the first axial stroke of the first jaw element and a screw thread between the second jaw element and the control shaft converts pivotal movement of the control lever to the second axial stroke of the second jaw element.

DESCRIPTION OF A PREFERRED EMBODIMENT

Figure 1:
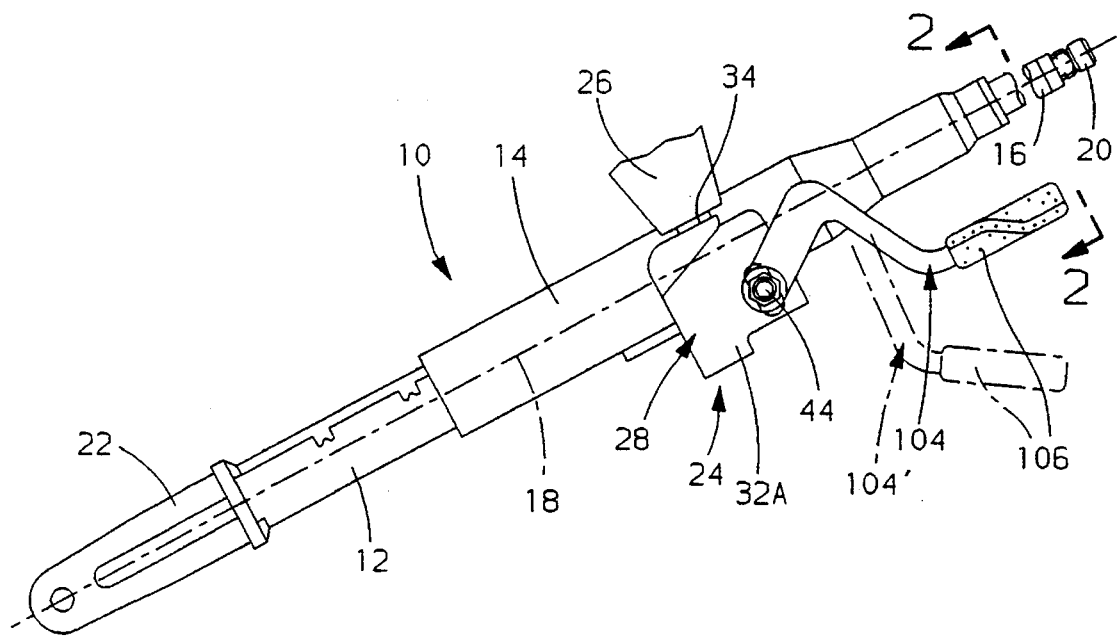
FIG. 1 is a fragmentary elevational view of an adjustable motor vehicle steering column having a position control apparatus according to this invention.

Referring to FIG. 1, a motor vehicle steering column 10 includes a tubular lower mast jacket 12 and a tubular upper mast jacket 14 telescopically overlapping the lower mast jacket. The steering column may have an energy absorbing apparatus, not shown, which permits controlled, longitudinal collapse of the upper mast jacket relative to the lower mast. A steering shaft 16 is supported on the mast jackets 12, 14 for rotation about a longitudinal centerline 18 of the steering column. A steering wheel, not shown, is attached to an end 20 of the steering shaft.

A fork-shaped clevis 22 is rigidly attached to the lower mast jacket 12 at the lower end thereof and connected to a motor vehicle body, not shown, such that the steering column is pivotally adjustable up and down about an axis perpendicular to the centerline 18 for changing the vertical position of the steering wheel. The upper mast jacket is moveable in and out relative to the lower mast jacket in the direction of the longitudinal centerline 18 for changing the horizontal position of the steering wheel. A position control apparatus 24 according to this invention is disposed between the steering column 10 and a structural element 26 of the vehicle body.

Figure 2:
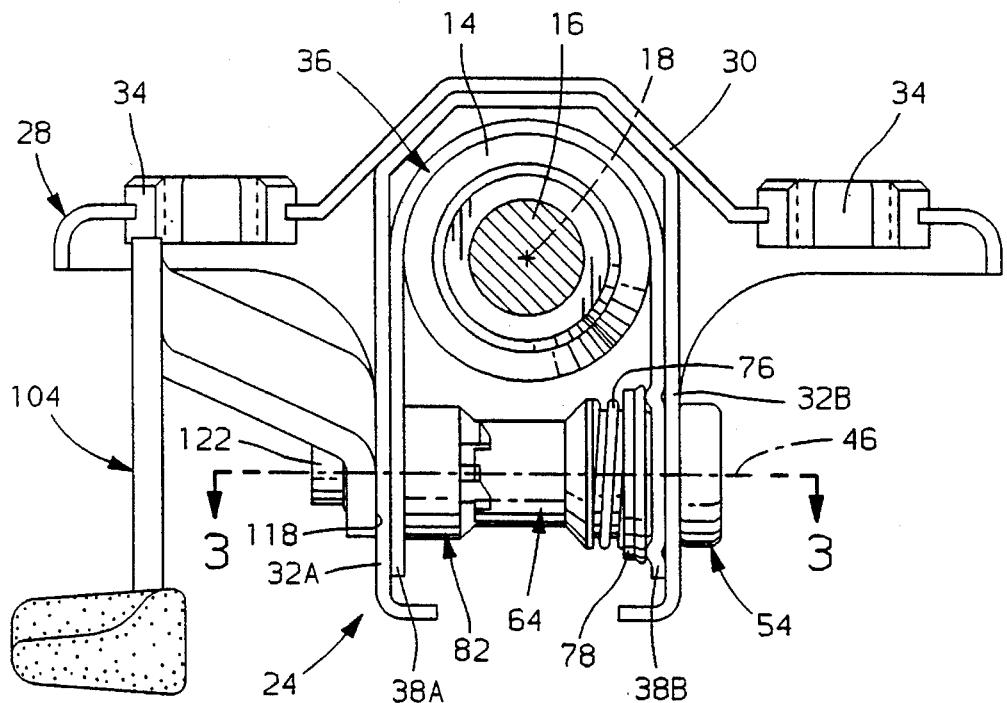
FIG. 2 is an enlarged sectional view taken generally along the plane indicated by lines 2—2 in FIG. 1.

As seen best in FIGS. 1–2, the control apparatus includes a stationary bracket 28 having a horizontal plate 30 and pair of vertical legs 32A–B on opposite sides of the upper mast jacket 14. Each of the vertical legs 32A–B is flexible transverse to the steering column. The horizontal plate 30 has a pair of slots therein each of which slidably receives a capsule 34. Each capsule is open in the center for passage therethrough of a hanger bolt, not shown, attached to the structural element 26. Nuts, not shown, on the hanger bolts below the capsules rigidly affix the capsules to the structural element 26 so that, except in an energy absorbing collapse event, the bracket 28 is rigidly connected to the vehicle body.

A column bracket 36 of the position control apparatus 24 in the shape of an inverted "U" is rigidly attached to the upper mast jacket 14 and includes a pair of vertical legs 38A–B juxtaposed the stationary vertical legs 32A–B, respectively, and flexible transverse to the steering column 10. The stationary vertical legs 32A–B have a pair of generally vertical slots 40A–B therein, respectively. The vertical legs 38A–B of the column bracket have a pair of horizontal slots 42A–B therein, respectively, which cross the vertical slots 40A–B.

Figure 3:
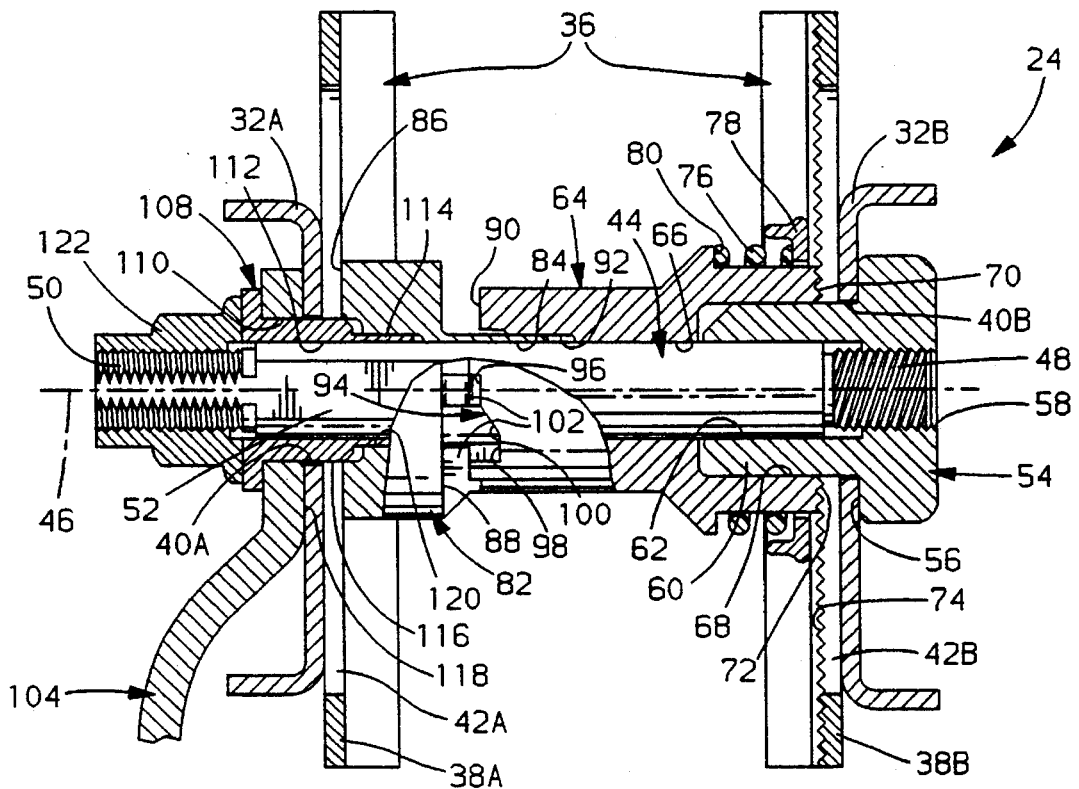
FIG. 3 is a fragmentary sectional view taken generally along the plane indicated by lines 3—3 in FIG. 2.
Figure 4:
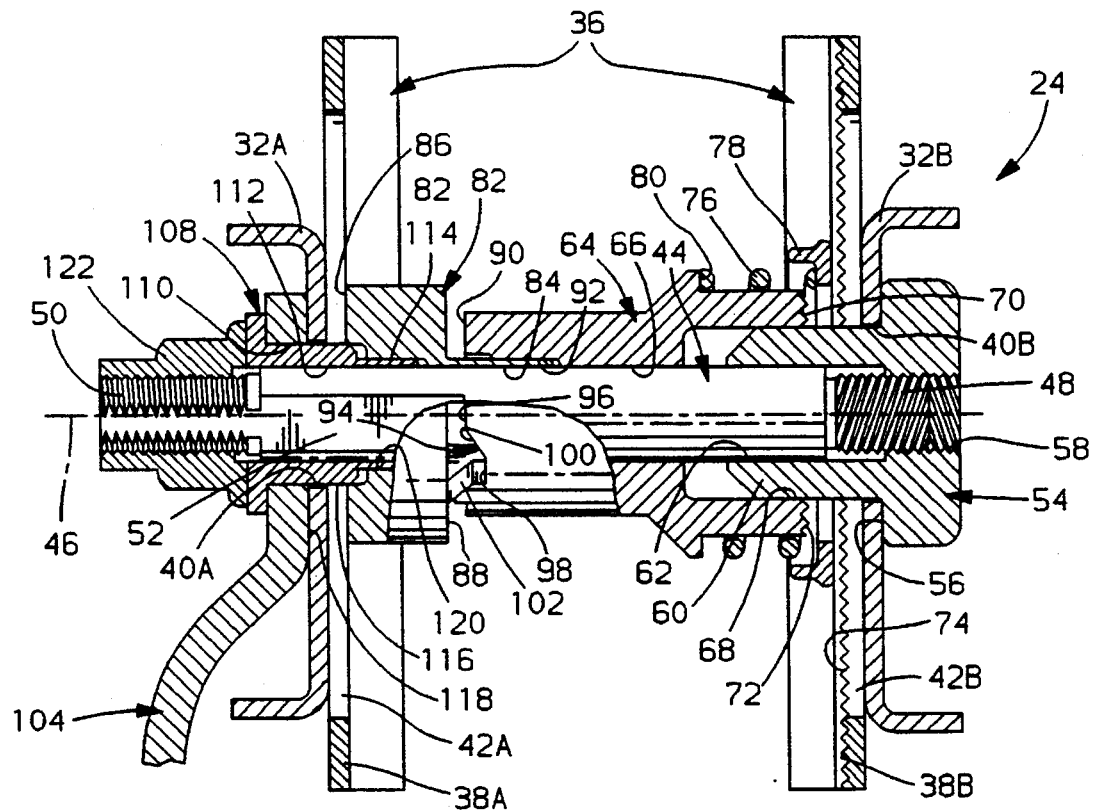
FIG. 4 is similar to FIG. 3 but showing elements of the position control apparatus according to this invention in different relative positions.
Figure 5:
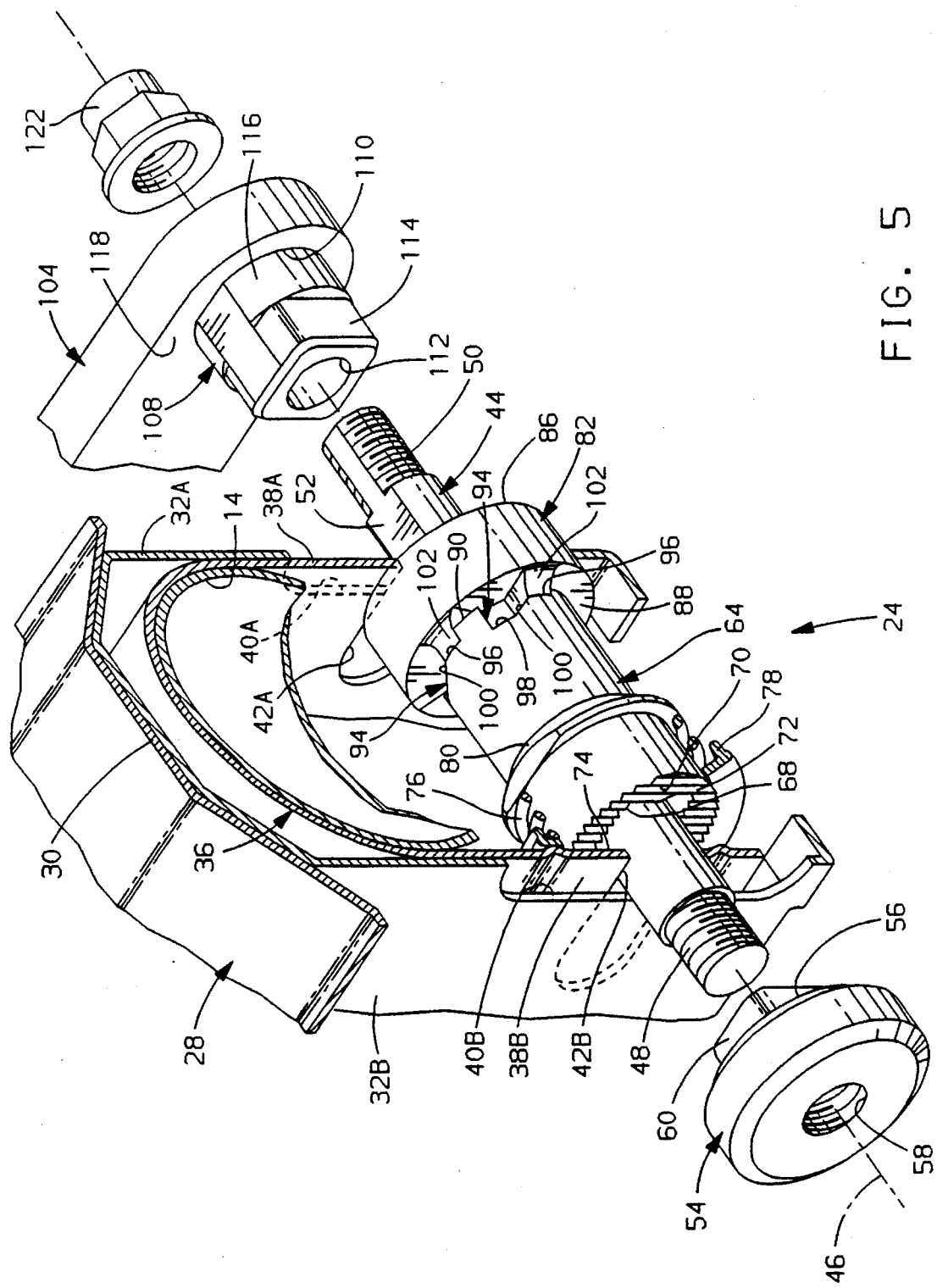
FIG. 5 is a fragmentary, exploded perspective view of the position control apparatus according to this invention viewed generally from a direction opposite to FIG. 2.

As seen best in FIGS. 3–5, a control shaft 44 of the position control apparatus 24 extends through each of the pairs of vertical and horizontal slots 40A, 42A and 40B, 42B. The horizontal slots 42A–B support the control shaft on the upper mast jacket for up and down movement therewith and for rotation about a centerline 46 of the control shaft. The sides of the vertical slots 40A–B prevent in and out movement of the control shaft 44 with the upper mast jacket 14 so that, with respect to such movement, the control shaft is stationary. Accordingly, in and out movement of the upper mast jacket 14 relative to the stationary bracket 28 is accommodated by the horizontal slots 42A–B in the vertical legs of the column bracket.

The control shaft 44 has a first screw thread 48 at one end outboard of the stationary vertical leg 32B and a second screw thread 50 at the other end outboard of the stationary vertical leg 32A. The control shaft 44 has a flat side 52 traversing the second screw thread 50 and an adjacent plain portion of the shaft longitudinally inboard of the second screw thread.

A first nut 54 has an annular side wall 56 around a threaded center 58 and a square pilot 60 perpendicular to the side wall with a plain bore 62 therein, FIGS. 3–4, contiguous with the threaded center 58. The first screw thread 48 on the control shaft 44 is received in the threaded center 58 in the nut with the side wall 56 facing the stationary vertical leg 32B, with the square pilot 60 projecting through the vertical and horizontal slots 40B, 42B, and with the plain bore 62 on a plain part of the control shaft. The first nut is moveable up and down with the control shaft 44 but restrained against rotation about the centerline 46 of the control shaft by interference between the square pilot 60 and the sides of the slots 40B, 42B.

A first tubular barrel 64 of the control apparatus 24 is journaled on the control shaft 44 between the vertical legs 38A–B of the column bracket by a plain bore 66 in the tubular barrel. The square pilot 60 on the first nut 54 seats in a correspondingly shaped cavity 68 in a first end wall 70 of the first tubular barrel facing the vertical leg 38B of the column bracket whereby the first barrel is restrained against rotation about the centerline 46 of the control shaft.

A plurality of vertical abutments or vertical spline teeth 72 on the end wall 70 of the first tubular barrel are engageable with a plurality of similarly shaped vertical abutments or spline teeth 74 on the vertical leg 38B of the column bracket above and below the horizontal slot 42B therein. A coil spring 76 around the first tubular barrel is seated at one end against an annular seat 78 slidable over the spline teeth 74 and at the other end against a shoulder 80 on the first tubular barrel and urges relative axial separation between the spline teeth 72, 74.

A second tubular barrel 82 of the control apparatus 24 is journaled on the control shaft 44 between the first tubular barrel 64 and the vertical leg 38A of the column bracket by a plain bore 84 in the second tubular barrel. The second tubular barrel has an annular first end wall 86 facing the vertical leg 38A of the column bracket and an annular second end wall 88 facing an annular second end wall 90 on the first tubular barrel 64. A cylindrical pilot 92 on the second tubular barrel extends into a counter bore in the first tubular barrel for maximizing the span of the journal between the control shaft and the second tubular barrel.

With continued reference to FIGS. 3–5, a plurality of rotary cam notches 94 are formed in the second end wall 90 of the first tubular barrel. Each notch has an upper platform 96, a lower platform 98, and a ramp 100 between the upper and lower platforms. A plurality of cam followers 102 on the second end wall 88 of the second tubular barrel project into corresponding ones of the cam notches 94. The spring 76 biases the ramps 100 and platforms 96, 98 against the cam followers 102 and, in turn, the first end wall 86 of the second tubular barrel 82 against the vertical leg 38A of the column bracket. Relative rotation between the first and second tubular barrels about the centerline 46 of the control shaft induces an axial stroke between the tubular barrels in the direction of the centerline 46 of the control shaft corresponding to the axial distance separating the upper and lower platforms 96, 98.

A control lever 104 of the position control apparatus 24 has a finger tab 106 rigidly attached to one end thereof and a thimble-shaped hub 108 rigidly mounted in an aperture 110 at the other end thereof. The hub 108 includes a bore 112 therethrough matching the D-shape of the control shaft 44 attributable to the flat side 52 thereof, a square pilot 114, and a cylindrical pilot 116 between the square pilot and a side wall 118 of the control lever. The hub 108 fits over the control shaft 44 from outboard of the stationary vertical leg 32A with the square pilot 114 seating in a correspondingly shaped cavity 120 in the first end wall 86 of the second tubular barrel 82 and with the cylindrical pilot 116 rotatable in the horizontal and vertical slots 40A, 42A. The control lever 104, the control shaft 44, and the second tubular barrel 82 are all rotatable as a unit about the centerline 46 of the control shaft. A second nut 122 on the second thread 50 of the control shaft outboard of the hub 108 retains the control lever 104 on the control shaft and rotates as a unit with the control shaft.

The first end wall 70 of the first tubular barrel 64 with the spline teeth 72 thereon defines a first jaw element of a clamp of the control apparatus 24 and the side wall 56 of the first nut 54 defines a second jaw element of the clamp each movable perpendicular to a vertical plane containing the centerline 18 of the steering column. The cam notches 94 on the first tubular barrel and the cam followers 102 on the second tubular barrel constitute a means for converting pivotal movement of the control lever 104 and control shaft 44 into an axial stroke of the first jaw element. The first screw thread 48 on the control shaft 44 and the threaded center 58 of the first nut 54 constitute a means for converting pivotal movement of the control lever and control shaft into an axial stroke of the second jaw element opposite to the axial stroke of the first jaw element.

The clamp of the control apparatus 24 is closed, FIGS. 1–3, in a clamping position of the control lever 104, FIG. 1, in which the cam followers 102 rest on the upper platforms 96 and the first nut 54 is innermost on the first screw thread 48. The closed clamp is thus characterized by maximum axial separation between the first end walls 70, 86 of the first and second tubular barrels and by minimum separation between the side walls 56, 118 of the first nut 54 and control lever 104, respectively.

When the clamp is closed, the vertical legs 32B, 38B are squeezed between the side wall 56 of the first nut 54 and the end wall 70 of the first tubular barrel 64 and the vertical legs 32A, 38A are squeezed between the end wall 86 of the second tubular barrel 82 and the side wall 118 of the control lever 104 for maximum frictional retention of the position of the column bracket 36 relative to the stationary bracket 28. Also, when the clamp is closed, the spline teeth 72 are held in engagement with the spline teeth 74 for maximizing the integrity of the retention of the mast jacket relative to the stationary bracket in the direction of the centerline 18 of the steering column so that in an energy absorbing collapse event, the stationary bracket releases immediately from the capsules 34.

To release the steering column for positional adjustment, the control shaft 44 and control lever 104 are pivoted clockwise, FIG. 1, by manual force on the finger tab 106 through an angular stroke from the clamping position of the lever to a releasing position 104' thereof, FIG. 1. Rotation of the control shaft induces relative rotation between the first and the second tubular barrels 64, 82 so that the cam followers 102 move across the ramps 100 from the upper platforms 96 to the lower platforms 98 to reduce to a minimum the axial separation between the first end walls 70, 86 on the first and second tubular barrels, respectively. Because the spring 76 holds the first end wall 86 against the vertical leg 38A of the column bracket, the aforesaid reduction in axial separation manifests itself as a first axial stroke of the first jaw element defined by the first end wall 70 away from the vertical leg 38B of the column bracket, FIG. 4.

Rotation of the control shaft from the clamping position to the releasing position of the control lever also induces concurrent, unscrewing relative rotation between the first nut 54 and the control shaft to increase to a maximum the axial separation between the side wall 56 of the nut and the side wall 118 of the control lever 104. Because the spring 76 holds seat 78 against the vertical leg 38B of the column bracket, and because the vertical legs 32B, 38B are both flexible in the direction of the centerline 46 of the control shaft so that the stationary vertical leg 32B remains against the nut, the aforesaid increase in axial separation manifests itself as a second axial stroke of the second jaw element defined by the side wall 56 of the nut 54 away from the first jaw element defined by the end wall 70 of the first tubular barrel 64. Accordingly, the total axial stroke between the first and second jaw elements corresponding to pivotal movement of the control lever from the clamping to the releasing position is the sum of the first and second axial strokes for maximum axial separation between the spline teeth 72, 74 in the releasing position of the control lever.

When the control lever is in the releasing position, the upper mast jacket 14 is adjustable in and out in a range limited by engagement of the control shaft on the ends of the horizontal slots 42A–B and up and down in a range limited by engagement of the control shaft on the ends of the vertical slots 40A–B. When a desired position is achieved, the control lever 104 is pivoted from the releasing position back to the clamping position to initiate reverse movement of the first and second jaw elements through the first and second axial strokes to restore the frictional and positive retention described above.

The embodiments of the invention in which an exclusive property or privilege is claimed are defined as follows:

1. A position control apparatus for a motor vehicle steering column having a mast jacket moveable in a vertical plane through a range of adjusted positions comprising:

a stationary bracket having a stationary leg adjacent said mast jacket flexible perpendicular to said vertical plane, a clamp means for preventing movement of said mast jacket through said range of adjusted positions when said clamp means is closed including a first jaw element on a first side of said stationary leg and a second jaw element on an opposite second side of said stationary leg, a control lever having an angular stroke between a clamping position and a releasing position, a first motion converting means connecting said control lever and said first jaw element operative to move said first jaw element through a first axial stroke in a first direction perpendicular to said vertical plane concurrently with pivotal movement of said control lever through said angular stroke thereof, a second motion converting means between said control lever and said second jaw element operative to move said second jaw element through a second axial stroke in a second direction perpendicular to said vertical plane opposite to said first direction concurrently with pivotal movement of said control lever through said angular stroke thereof so that a total axial stroke between said first and said second jaw elements corresponding to pivotal movement of said control lever through said angular stroke thereof is the sum of said first and said second axial strokes of said first and said second jaw elements, and a spring between said first jaw element and said stationary leg biasing said stationary leg against said second jaw element throughout said total axial stroke between said first and said second jaw elements.

2. The position control apparatus recited in claim 1 wherein said first motion converting means includes:

a control shaft rotatable about a centerline thereof perpendicular to said vertical plane, and a rotary cam means including a cam connected to one of said first jaw element and said control shaft and a cam follower engageable on said cam connected to the other of said first jaw element and said control shaft so that rotation of said control shaft effects relative rotation between said cam and said cam follower.

3. The position control apparatus recited in claim 1 wherein said second motion converting means includes:

a control shaft having a first screw thread thereon rotatable about a centerline thereof perpendicular to said vertical plane, and a screw thread means on said second jaw element engaging said first screw thread on said control shaft.

4. A steering apparatus for a motor vehicle comprising:

a steering column having a mast jacket moveable in and out in the direction of a longitudinal centerline of said steering column through a range of adjusted positions, a stationary bracket having a pair of stationary legs on opposite sides of said mast jacket parallel to a vertical plane containing said centerline of said steering column and flexible perpendicular to said vertical plane, a control shaft supported on said stationary bracket for rotation about a centerline of said control shaft perpendicular to said vertical plane, a column bracket rigidly attached to said mast jacket having a pair of vertical legs juxtaposed respective ones of said pair of stationary legs and flexible perpendicular to said vertical plane, each of said vertical legs of said column bracket have a slot therein parallel to said centerline of said steering column and receiving therethrough said control shaft, a clamp means on said control shaft for preventing movement of said mast jacket in the direction of said centerline of said steering column when said clamp means is closed including a first jaw element on a first side of one said vertical legs of said column bracket and a second jaw element on an opposite side of said juxtaposed one of said stationary legs, a control lever rigidly connected to said control shaft having an angular stroke between a clamping position and a releasing position, a first motion converting means connecting said control shaft and said first jaw element operative to move said first jaw element through a first axial stroke in a first direction perpendicular to said vertical plane concurrently with pivotal movement of said control lever through said angular stroke thereof, and a second motion converting means between said control shaft and said second jaw element operative to move said second jaw element through a second axial stroke in a second direction perpendicular to said vertical plane opposite to said first direction concurrently with pivotal movement of said control lever through said angular stroke thereof so that a total axial stroke between said first and said second jaw elements corresponding to pivotal movement of said control lever through said angular stroke thereof is the sum of said first and said second axial strokes of said first and said second jaw elements.

5. The position control apparatus recited in claim 4 further comprising:

a spring between said first jaw element and said one vertical leg of said column bracket biasing each of said one vertical leg and said juxtaposed one of said stationary legs against said second jaw element throughout said total axial stroke between said first and said second jaw elements.

6. The position control apparatus recited in claim 5 further comprising:

a first plurality of flat spline teeth perpendicular to said centerline of said steering column on said first jaw element, and a second plurality of flat spline teeth perpendicular to said centerline of said steering column on said one vertical leg of said column bracket engageable on said first plurality of flat spline teeth when said clamp means is closed to positively prevent movement of said mast jacket in the direction of said centerline of said steering column.

7. The position control apparatus recited in claim 6 wherein said first motion converting means includes:

a first tubular barrel rotatably journaled on said control shaft and restrained against rotation about said centerline of said control shaft having a first end wall thereof forming said first jaw element, a second tubular barrel supported on said control shaft for rotation as a unit therewith having an end wall facing a second end wall of said first tubular barrel, and a rotary cam means including a cam defined on one of said second end wall of said first tubular barrel and said end wall of said second tubular barrel and a cam follower defined on the other of said second end wall of said first tubular barrel and said end wall of said second tubular barrel engageable on said cam so that rotation of said control shaft effects relative rotation between said cam and said cam follower.

8. The position control apparatus recited in claim 7 wherein said second motion converting means includes:

a first screw thread on said control shaft, and a nut having a side wall defining said second jaw element and a threaded center received on said first screw.

* * * * *